May 17, 1938.  H. A. JOHNSTON  2,117,765

VEGETABLE PEELING MACHINE

Filed Oct. 9, 1936

Inventor
H. A. Johnston
by J. Edw. Maybee
ATTY.

Patented May 17, 1938

2,117,765

UNITED STATES PATENT OFFICE 2,117,765

VEGETABLE PEELING MACHINE

Howard Addison Johnston, Toronto, Ontario, Canada

Application October 9, 1936, Serial No. 104,796

9 Claims. (Cl. 146—49)

This invention relates to vegetable peeling machines and more particularly to the type having a rotatable disk driven by a water motor and positioned at the bottom of a cylinder. The object of the present invention is to so construct the peeling machine that the waste water from the water motor may be utilized for cleaning the vegetables in the machine and washing away the removed particles of peeling. A further object is to devise simple means whereby the nozzle for the water motor may also be employed for directing water into the machine to clean it out after use.

I attain my objects by providing an abrading cylinder having an abrading disk mounted to rotate therein. The underside of the disk is provided with a plurality of blades or buckets against which is directed a stream of water to cause the disk to be rotated. The vegetables being peeled are supported on the upper side of the disk and the water deflected from the blades is directed into the interior of the cylinder just above the disk. Means is provided to direct this flow of such water transversely of the cylinder so that it will be confined to the lower portion of that part of the cylinder containing the vegetables.

A nozzle, connected with one end of a tube the other end of which is adapted to be removably connected with a tap or other source of water supply, is adapted to be received in a guide carried by the cylinder for directing a stream of water against the blades. The nozzle is provided with a shoulder which is automatically locked by a spring finger when the nozzle is inserted in the guide. By manually operating the finger to disengage the shoulder the nozzle may be withdrawn from the guide and the water from the nozzle may be directed into the cylinder to thoroughly clean the latter after use.

The constructions are hereinafter more fully described and illustrated in the accompanying drawing in which—

Figure 1:
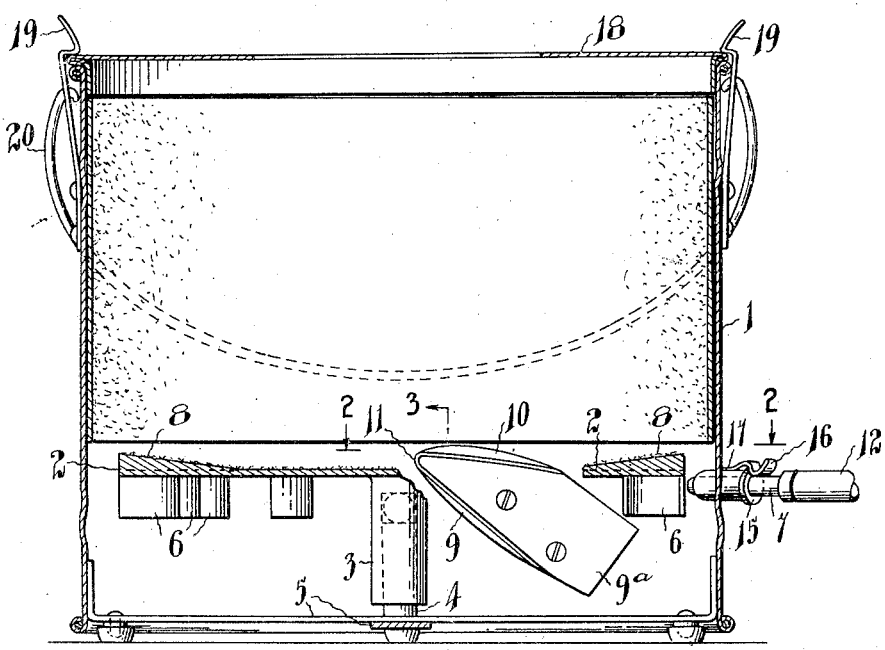
Figure 3:
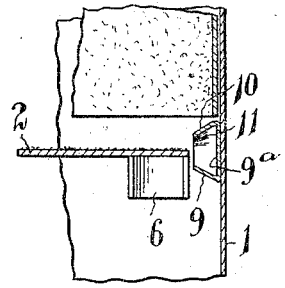
Figure 2:
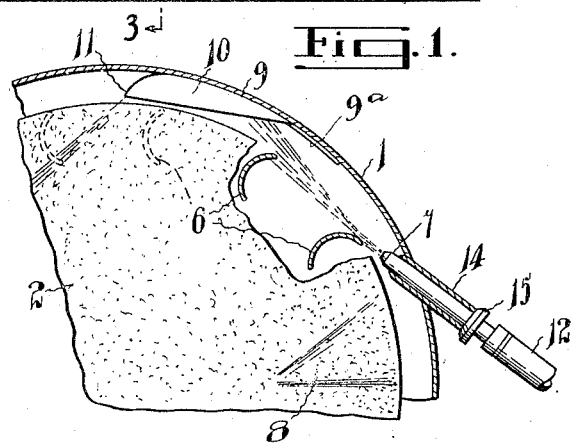

Fig. 1 is a longitudinal sectional view of my vegetable peeler;

Fig. 2 a horizontal sectional detail on an enlarged scale on the line 2—2 in Fig. 1;

Fig. 3 a vertical sectional detail on the line 3—3 in Fig. 1; and

Figure 4:
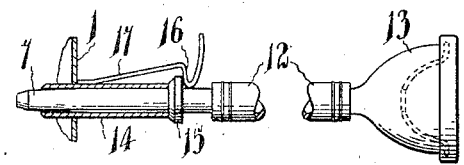

Fig. 4 a detail of the nozzle guide and catch for nozzle.

In the drawing like numerals of reference indicate corresponding parts in the different figures.

1 is a cylinder which is open at both ends. A disk 2 is provided with a hub 3 journalled on a spindle 4 carried by a spider 5 which is secured within the lower end of the cylinder. The underside of the disk is provided with a plurality of blades or buckets 6 against which a stream of water from a nozzle 7 is directed to cause the disk to be rotated. The inner wall of the cylinder above the disk and the upper side of the disk are provided with any suitable abrading material for removing the peeling from the vegetables which are supported by the disk within the cylinder. The upper side of the disk is also provided with a plurality of projections 8 for agitating the vegetables to cause them to tumble about within the cylinder and present fresh areas of their surfaces to the abrading material.

Water is directed into the cylinder to wash the vegetables therein and to clean away the removed particles of peeling. All the water from the nozzle 7 is directed against the blades 6 and as the latter move one by one into the path of the stream of water from the nozzle some of the water is deflected laterally from the blades towards the inner wall of the cylinder 1. The periphery of the disk 2 is spaced from the inner wall and through this space is passed a deflector 9 for directing the water deflected from the blades 6 to a point above the disk. Preferebly the deflector is formed integral with a strip 9ᵃ of sheet metal secured to the inner wall of the cylinder with the deflector positioned at an angle to the horizontal and projecting inwardly from the inner wall of the cylinder.

Across the upper end of the strip 9ᵃ is formed or secured a lip 10 which also projects inwardly from the inner wall of the cylinder. The lip extends above the disk 2 and has a downward inclination from the said wall to check upward movement of the water. The upper ends of the lip and deflector terminate in a guide 11 which also projects inwardly from the inner wall of the cylinder and is adapted to discharge the water transversely of the cylinder and downwardly at an angle to the surface of the disk 2.

With this construction, water which would otherwise be wasted is utilized for maintaining a constant supply in the cylinder above the disk without decreasing the pressure of the water for the water motor and without danger of the water issuing in a stream through the upper end of the cylinder.

The nozzle 7 may be connected in any suitable manner, such as by a tube 12 and fitting 13, with a source of water supply. The fitting 13 is adapted to be detachably secured to a tap or other water outlet and the nozzle 7 is adapted to be received in a guide 14 carried by the cylinder 1. The nozzle is provided with a shoulder 15 which is adapted to be engaged by a catch 16 on a spring finger 17 carried by the cylinder to releasably lock the nozzle in the guide. The catch is so shaped that it will be automatically engaged with the rear side of the shoulder 15 when the nozzle is positioned in the guide and that it may be easily disengaged from the shoulder. The nozzle may thus be employed to wash off the vegetables thoroughly before removing them from the peeling machine and to clean the latter after use.

The upper end of the cylinder 1 may be closed by a cover 18 having an inspection opening therein. Spring catches 19 are provided to retain the cover in position and on these catches are pivoted the ends of a bail shaped carrier 20.

What I claim as my invention is:

1. A vegetable peeling machine including a cylinder; a disk mounted to rotate in the cylinder; a plurality of blades carried by the underside of the disk; a nozzle for directing a stream of water against the blades to cause the disk to be rotated; and means extending from a point below the underside of the disk to a point above the upper side thereof for directing water deflected from the blades to the interior of the cylinder above the upper side of the disk, the said means including provisions located adjacent the upper side of the disk for limiting the flow of such water in an upward direction relative to the disk.

2. A vegetable peeling machine including a cylinder; a disk mounted to rotate in the cylinder, the periphery of the disk being spaced from the inner wall of the cylinder; a plurality of blades carried by the underside of the disk; a nozzle for directing a stream of water against the blades to cause the disk to be rotated; and an upwardly inclined deflector extending around a portion of the inner wall of the cylinder and from a point below the disk to a point above the disk for directing water deflected from the blades, through the space between the disk and inner wall to the upper side of the disk, the deflector having provisions for causing the water directed by the deflector to flow across the upper side of the disk.

3. A vegetable peeling machine including a cylinder; a disk mounted to rotate in the cylinder, the periphery of the disk being spaced from the inner wall of the cylinder; a plurality of blades carried by the underside of the disk; a nozzle for directing a stream of water against the blades to cause the disk to be rotated; a deflector extending around a portion of the inner wall of the cylinder and from a point below the disk to a point above the disk for directing water deflected from the blades, through the space between the disk and inner wall to the upper side of the disk; and a lip projecting inwardly from the inner wall for causing the water directed by the deflector to flow across the upper side of the disk.

4. A vegetable peeling machine including a cylinder; a disk mounted to rotate in the cylinder, the periphery of the disk being spaced from the inner wall of the cylinder; a plurality of blades carried by the underside of the disk; a nozzle for directing a stream of water against the blades to cause the disk to be rotated; means for guiding water deflected from the blades to the interior of the cylinder above the disk comprising a deflector projecting inwardly from the inner wall of the cylinder from a point below the disk to a point above the disk through the space between the disk and inner wall; a lip projecting inwardly from the inner wall spaced from and above the deflector to check upward movement of the water; and an inwardly directed guide between the lip and deflector at their upper ends adapted to direct water from between the lip and deflector inwardly across the disk.

5. A vegetable peeling machine including a cylinder; a disk mounted to rotate in the cylinder; a plurality of blades carried by the underside of the disk; a nozzle for directing a stream of water against the blades to cause the disk to be rotated; and a water conduit carried by the cylinder and extending from a point below the disk to a point above the disk adapted to receive water deflected from the blades below the disk and to direct it to a point above the disk, the said conduit having provisions for discharging the water at an angle to the upper surface of the disk.

6. A vegetable peeling machine including a cylinder; a disk mounted to rotate in the cylinder; a plurality of blades carried by the underside of the disk; a nozzle for directing a stream of water against the blades to cause the disk to be rotated; and a water conduit carried by the cylinder adapted to receive water deflected from the blades below the disk and to direct it to a point above the disk, the said conduit having provisions for discharging the water transversely of the cylinder and against the upper side of the disk.

7. A vegetable peeling machine including a cylinder; a disk mounted to rotate in the cylinder, the periphery of the disk being spaced from the inner wall of the cylinder; a plurality of blades carried by the underside of the disk; a nozzle for directing a stream of water against the blades to cause the disk to be rotated; a deflector extending around a portion of the inner wall of the cylinder and from a point below the disk to a point above the disk for directing water deflected from the blades, through the space between the disk and inner wall to the upper side of the disk; and a lip projecting inwardly from the inner wall and having a downward inclination for causing the water directed by the deflector to flow across the upper side of the disk.

8. A vegetable peeling machine including a cylinder; a disk mounted to rotate in the cylinder, the periphery of the disk being spaced from the inner wall of the cylinder; a plurality of blades carried by the underside of the disk; a nozzle for directing a stream of water against the blades to cause the disk to be rotated; means for guiding water deflected from the blades to the interior of the cylinder above the disk comprising a deflector projecting inwardly from the inner wall of the cylinder from a point below the disk to a point above the disk through the space between the disk and inner wall; a downwardly inclined lip projecting inwardly from the inner wall spaced from and above the deflector to check upward movement of the water; and an inwardly directed guide between the lip and deflector at their upper ends adapted to direct water from between the lip and deflector inwardly across the disk.

9. A vegetable peeling machine including a cylinder; a disk mounted to rotate in the cylinder, the disk having a plurality of blades located below its upper surface; a nozzle for directing a stream of water against the blades to cause the disk to be rotated; and means extending from a point below the upper side of the disk and opposite the blades to a point above the upper side of the disk for directing water deflected from the blades to the interior of the cylinder above the upper side of the disk, the said means including provisions located adjacent the upper side of the disk for limiting the flow of such water in an upward direction relative to the disk and for directing the water across the upper side of the disk.

HOWARD ADDISON JOHNSTON.